United States Patent [19]

Poirier

[11] 3,896,071

[45] July 22, 1975

[54] STORAGE STABLE AQUEOUS DISPERSION OF TETRAFLUORETHYLENE POLYMER

[75] Inventor: Robert Victor Poirier, Vienna, W. Va.

[73] Assignee: E. I. du Pont de Nemours & Co., Wilmington, Del.

[22] Filed: July 10, 1974

[21] Appl. No.: 487,266

Related U.S. Application Data

[63] Continuation-in-part of Ser. No. 301,537, Oct. 27, 1972, abandoned.

[52] U.S. Cl. . 260/29.6 F; 117/126 R; 260/29.6 ME

[51] Int. Cl. .......... C08f 45/24

[58] Field of Search .......... 260/29.6 F

[56] References Cited

UNITED STATES PATENTS 2,937,156 5/1960 Berry .......... 260/29.6 F

*Primary Examiner*—Harold D. Anderson

[57] ABSTRACT

Aqueous dispersion of tetrafluoroethylene polymer is made storage stable by adding to the dispersion a moderate amount of nonionic surfactant, e.g., from about 1 to 6% by weight thereof, and about 1 to 6% by weight of an essentially hydrophilic water soluble alkylene oxide polymer such as polyethylene glycol. The resultant dispersion is useful as a coating composition, for example to coat glass fabric, with a minimal loss of tetrafluoroethylene polymer by settling in the dispersion during storage of the dispersion prior to coating.

4 Claims, No Drawings

STORAGE STABLE AQUEOUS DISPERSION OF TETRAFLUORETHYLENE POLYMER

CROSS-REFERENCE TO RELATED CASE

This application is a continuation-in-part of application Ser. No. 301,537, filed Oct. 27, 1972, now abandoned.

This invention relates to aqueous dispersions of tetrafluoroethylene polymer and more particularly to the aspect of storage stability thereof.

Basically, aqueous dispersion of tetrafluoroethylene polymer is made by pressuring tetrafluoroethylene and other comonomers, if any, into an aqueous solution of polymerization initiator and fluorocarbon dispersing agent under mild agitation and polymerizing conditions of temperature and pressure and obtaining as a result thereof an aqueous dispersion of about 15 to 45% by weight of colloidal size tetrafluoroethylene particles less than 1.0 micron in diameter. While the amount of dispersing agent used (less than 1.0% used based on the weight of polymer solids) during polymerization is adequate to prevent coagulation from occurring during the polymerization, it is usually not adequate to prevent the colloidal size particles from settling out during storage of the dispersion. The settled particles form an irreversible coagulum which represents a yield loss in applications in which the dispersion is used for coating purposes.

To prevent such settling out during storage, a nonionic surfactant is usually added to the dispersion after the polymerization reaction is completed to stabilizing the dispersion by preventing the premature settling of the tetrafluoroethylene polymer particles (hereinafter called polymer solids).

The addition of the nonionic surfactant was also found to be helpful during concentrating polytetrafluoroethylene particles in the aqueous phase of the dispersion under certain conditions of surfactant addition and heating to form a decantable layer of water and surfactant, as described in U.S. Pat. No. 3,037,953 and 3,301,807. After concentration, additional surfactant is added to the concentrate for improved stability. In the latter patent the second addition is of higher molecular weight than the first surfactant added for concentration. The higher molecular weight surfactant is disclosed in U.S. Pat. No. 3,301,807 to be more effective, because it requires less additional water as aqueous surfactant solution being added to the dispersion, the additional water having the disclosed undesirable effect of reducing the viscosity of the dispersion.

In a recent discovery described in U.S. Pat. No. 3,705,867, as the nonionic surfactant concentration was increased from the maximum of 6% by weight normally used theretofore, the dispersion of polymer underwent a surprising increase in viscosity, resulting in improved storage stability for the dispersion. These stabilized dispersions exhibited a viscosity of 20 centipoises (cps) and higher and more often greater than 30 cps. Unfortunately, however, the viscosity of the stabilized dispersion was extremely sensitive to surfactant concentration level and/or temperature, making it difficult to supply to dispersion users an aqueous dispersion that would perform reproducibly.

The present invention provides tetrafluoroethylene polymer aqueous dispersion compositions having improved stability characteristics and properties. The compositions consist essentially of an aqueous dispersion of tetrafluoroethylene polymer in which the polymer is present in particle form in an amount of between 55–65% based on weight of dispersion, having dissolved in the aqueous phase thereof a moderate amount (1–6%) of nonionic surfactant and about 1–6% of an essentially hydrophilic alkylene oxide polymer having a molecular weight of at least 5000 which is not a surfactant in the dispersion of this invention. The %'s are by weight based on weight of polymer solids.

The dispersions have improved storage stability over dispersions stabilized with nonionic surfactant alone. This advantage can be obtained at lower dispersion viscosities which is important where ease of application to substrates is critical. In addition, the dispersions of this invention exhibit high stability without requiring large amounts of nonionic surfactant, thereby avoiding the concomitant effect of sharp viscosity increases with certain small increases in nonionic surfactant content. Furthermore, the problems of viscosity sensitivity to nonionic surfactant content and the need to burn out large amounts of nonionic surfactant during the sintering or fusing of the polymer are essentially overcome. More rapid burn out is obtained than with nonionic surfactant used alone. Finally, the presence of the alkylene oxide polymer in the mixture results in tetrafluoroethylene polymer particles that coalesce better during drying of the particles, which in turn permits greater sintered film thickness without cracking.

With respect to the essentially hydrophilic alkylene oxide polymer component of compositions of the present invention, these polymers are composed of repeat alkylene oxide units and are water soluble at room temperature, i.e., 25°C. to the extent of at least 25g. per 100g. of solution. The alkylene oxide polymer is employed in the compositions of this invention in amounts of between about 1–6% by weight based on the weight of the tetrafluoroethylene polymer (polymer solids) present in the composition. The alkylene oxide units of the polymer are selected to give it its essentially hydrophilic character, examples of such units being ($-CH_2O-$), ($-CH_2CH_2O-$), and

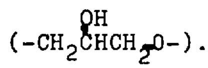

Propylene oxide

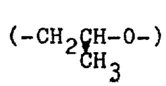

and higher alkylene oxide units should be avoided except that small proportions thereof can be present if scattered randomly in the polymer to avoid creating hydrophobic segments in the polymer or if the higher alkylene oxide units are substituted sufficiently with substituents such as OH in the case of the

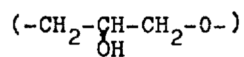

units which give the unit a hydrophilic character.

The essentially hydrophilic character of the alkylene oxide polymer is thus to be contrasted with the hydrophilic-hydrophobic character of the nonionic surfactants used in compositions of the present invention, wherein the hydrophobic moiety of the surfactant appears to be absorbed on the surface of the tetrafluoroethylene polymer (particles) dispersed in the aqueous phase. In contrast, the absence of this hydrophobic character from the alkylene oxide polymers used in the present invention means that these polymers do not act as a surfactant in the tetrafluoroethylene polymer dispersions of this invention. The advantages of improved storage stability at a lesser dispersion viscosity and reduced temperature sensitivity of the dispersion when stabilized according to the present invention reflect this lack of co-action between the dispersed tetrafluoroethylene polymer and the alkylene oxide polymer components. The composition of the latter component is, therefore, essentially hydrophilic to exclude the presence of moieties that would impart hydrophobicity and thus a surfactant character to the polymer.

To illustrate the non-surfactant nature of these polymers, aqueous dispersion of tetrafluoroethylene polymer (35% polymer solids-dispersion basis) as received from the polymerization reaction containing less than 1% by weight of dispersing agent (polymer basis) will coagulate in several seconds when subjected to the shearing action of a Waring Blendor Model 702B (2-speed) operating at the high speed. As little as 3% by weight of nonionic surfactant (polymer basis) imparts sufficient stability to the dispersion that the same shearing action does not produce coagulation until after several minutes have passed, a hundred-fold improvement in stability. In contrast, the same level and even much higher levels of essentially hydrophilic alkylene oxide polymer in the as polymerized dispersion (no nonionic surfactant present) imparts no noticeable stabilizing effect to the dispersion; the dispersion still coagulates within several seconds after the Waring Blender high speed shear is begun.

The combination of this alkylene oxide polymer with moderate amounts of nonionic surfactant, however, produces a better stabilizing result than when the latter is used by itself.

Examples of essentially hydrophilic alkylene oxide polymers used in the present invention include poly (oxymethylene), poly (ethylene oxide) (most commonly known and available as the polyethylene glycols) and polyglycerol. In each of these, other hydrophilic moieties may be present such as methylene oxide units in the ethylene oxide polymer and hydroxyl units substituted along the polymer chain or at one or more of the polymer end groups. One commercially available polyethylene glycol, Polyethylene Glycol Compound 20 M, having a molecular weight of about 15,000 is believed to be composed of two smaller polyethylene glycol chains connected together by maleic anhydride.

The amount of this polymer used in the present invention will depend on its molecular weight, the degree of stabilization desired, and the tetrafluoroethylene polymer concentration of the aqueous dispersion. Generally, as the molecular weight goes down, the amount of this polymer required goes up and the relationship is also observed for polymer solids concentration. Thus, the lower limit on the molecular weight of the alkylene oxide polymer should be about 5000 in order to provide effective storage stabilization without using un-economically large amounts of the polymer. There is no upper limit critical with respect to the molecular weight of the polymer save that imposed by its solubility in water. Usually, however, molecular weights above 25,000 are not employed. Alkylene oxide polymers of molecular weight of 5000 or more are normally solids under standard conditions, and have low solubility in water. As recited above, the polymers should be soluble at 25°C. to the extent of at least 25 gm. per 100 gm. of solution. For the dispersions and alkylene oxide polymers generally available, generally at least 1% by weight of this polymer is required in combination with nonionic surfactant to obtain a noticeable improvement in dispersion stability. Usually no more than 6% by weight of this polymer is required to get the best possible stabilization.

With respect to the nonionic surfactant component in the composition of the present invention, this component is any nonionic surfactant which is soluble in water at room temperature (20°–25°C.) at the concentration desired. The nonionic surfactant can be composed of a single surfactant or a mixture of nonionic surfactants. The nonionic surfactant preferably should have sufficient volatility so that at least 95 percent by weight of the surfactant is burned out of the polytetrafluoroethylene during its sintering which is generally done at a temperature in the range of 340° to 400°C. for 5 seconds to 10 minutes. Typically such surfactants are prepared as reaction products of ethylene oxide with other compounds which impart hydrophobic moieties to the resultant surfactant, as propylene oxide, amines, saturated and unsaturated alcohols and acids, and alkyl phenols. For purposes of illustration, some of the foregoing mentioned nonionic surfactants are further illustrated hereinafter by the formulae:

$$R\,[\,O\,(A)_n\,H\,]_x$$

wherein $(A)_n$ is the group $-(C_2H_4O)-_n$ or a mixture of the groups $-(C_2H_4O)-_a$ and $-(C_3H_6O)-_b$, wherein $n$ in each instance is an integer of from 2 to 50 and preferably 2 to 18, $b$ is an integer of 0 to 30, and $a$ is an integer of at least 2, $a+b$ being equal to $n$; $x$ is an integer of 1, 2, or 3; and R is an aliphatic hydrocarbon group which can be saturated or unsaturated, straight-chain, branched, or cyclic, or combinations thereof and will generally contain from 8 to 24 carbon atoms, preferably from 8 to 18 carbon atoms; examples of R groups include oleyl, stearyl, tridecyl, lauryl, decyl and the groups derived from aliphatic glycols and triols; $R'-C_6H_4O\,(B)_mH$, wherein B is the group $-(C_2H_4O)-_c$ or a mixture of the groups $-(C_2H_4O)-_c$ and $-(C_3H_6O)-_d$, wherein $m$ in each instance is an integer of from 2 to 50 and preferably 8 to 20, $d$ is an integer of 0 to 30, $c$ is an integer of at least 2, $c+d$ being equal to m; R' is a monovalent aliphatic and usually saturated and containing 4 to 20 carbon atoms and preferably 8 to 12 carbon atoms;

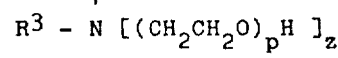

$$R^3 - \overset{R^2}{N}\,[(CH_2CH_2O)_pH\,]_z$$

and

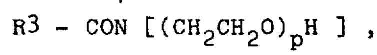

$$R3 - CO\overset{R^2}{N}\,[(CH_2CH_2O)_pH\,]\,,$$

wherein $p$ is an integer of 2 to 50, $z$ is an integer of 1 or 2, $R^3$ is an alkyl group containing 1 to 8 carbon atoms, $R^2$ is a chemical bond to a group $-(CH_2CH_2O)_pH$, when z is 2 and an alkyl group of 1 to 8 carbon atoms when z is 1, with the proviso that at least 5 carbon atoms are provided by $R^2 + R^3$; the polyalkylene oxide block copolymers of the formula $HO\ (C_2H_4O)_e(C_3H_6O)_f(C_2H_4O)_gH$ , wherein $f$ is an integer of from 15 to 65 and $e$ and $g$ are integers sufficiently large that $e + g$ total 20 to 90 percent of the total weight of the polymer. For each of the surfactants of the foregoing described formulae, the hydrophobic and hydrophilic moities are proportioned such and the total molecular weight is such that the aforementioned requirement of water solubility is met and preferably that the aforementioned degree of volatility is also met.

Additional specific surfactants include

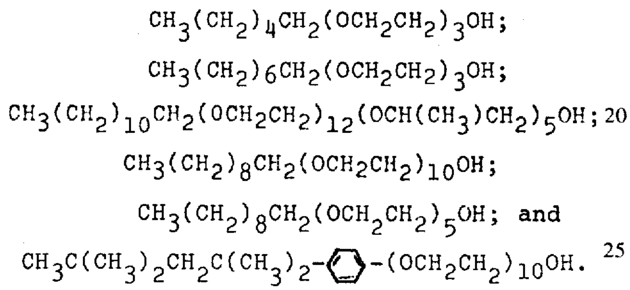

$CH_3(CH_2)_4CH_2(OCH_2CH_2)_3OH$;

$CH_3(CH_2)_6CH_2(OCH_2CH_2)_3OH$;

$CH_3(CH_2)_{10}CH_2(OCH_2CH_2)_{12}(OCH(CH_3)CH_2)_5OH$;

$CH_3(CH_2)_8CH_2(OCH_2CH_2)_{10}OH$;

$CH_3(CH_2)_8CH_2(OCH_2CH_2)_5OH$; and $CH_3C(CH_3)_2CH_2C(CH_3)_2$-⟨phenylene⟩-$(OCH_2CH_2)_{10}OH$.

The concentration of nonionic surfactant used in compositions of the present invention is generally that amount sufficient to stabilize the polymer particles in the dispersion, preventing them from coagulating. Theoretically, this will be the amount required to coat the surface of the polymer particles in the dispersions, which depends on the surface area of the polymer particles, which in turn depends on the particle size and weight % of polymer present: As a practical matter, however, some excess of surfactant is present to insure coverage over all the polymer particles present, but even so this is a much smaller amount than required in the aforesaid U.S. Pat. No. 3,705,867 to obtain the surprising increase in dispersion viscosity. For a commonly used nonionic surfactant "Triton" X-100, from 2 to 4% by weight is generally adequate for the available polymer dispersions of most interest. For other nonionic surfactants of higher or lower molecular weight, greater or lesser amounts, respectively, may be required. Overall, the nonionic surfactant concentration in compositions of the present invention can be from 1 to 6% by weight. The surfactant concentrations recited herein are based on the weight of polymer solids in the dispersion.

The tetrafluoroethylene polymer in the compositions of this invention can consist of the homopolymer, polytetrafluoroethylene, or can be a copolymer of tetrafluoroethylene with a minor proportion, e.g. up to 35% by weight based on weight of copolymer of another copolymerizable ethylenically unsaturated monomer. For example, the homopolymer can include small amounts of comonomer modifier, wherein the homopolymer still retains its non-melt fabricable character, such as up to two percent by weight of polymer units derived by copolymerization with tetrafluoroethylene of perfluoroalkyl or oxyperfluoroalkyl trifluoroethylene of 3 to 10 carbon atoms, and preferably hexafluoropropylene, as disclosed in U.S. Pat. No. 3,142,665 to Cardinal, Edens, and Van Dyk. Larger amounts of these monomers or other monomers can be present in amounts up to 35 percent by weight to render the resultant copolymer melt fabricable. Examples of such copolymers include copolymers of tetrafluoroethylene with such monomers as hexafluoropropylene, as disclosed in U.S. Pat. No. 3,946,763 to Bro and Sandt, higher perfluoroalkenes such as those containing from 4 to 10 carbon atoms, perfluoro(alkyl vinyl ethers) such as perfluoroethyl or perfluoropropyl vinyl ether, disclosed in U.S. Pat. No. 3,132,123 to Harris and McCane, perfluoro-(2-methylene-4-methyl-1,3-dioxolane) disclosed in U.S. Pat. No. 3,308,107 to Selman and Squire, and the highly fluorinated monomers in which a single hydrogen is present which does not change the fluorocarbon character of the copolymer, such monomers being for example 2-hydroperfluoroalkene containing 1 to 3 carbon atoms such as 2-hydropentafluoropropene, the omegahydroperfluoroalkenes containing from 3 to 10 carbon atoms, and the omega-hydroperfluoro(alkyl vinyl ethers) in which the alkyl group contains from 1 to 5 carbon atoms.

The polytetrafluoroethylene in the aqueous dispersion composition of the present invention is the aqueous dispersion type of polytetrafluoroethylene as distinguished from the granular type. The polytetrafluoroethylene is of extremely high molecular weight as indicated by a specific melt viscosity of at least $1 \times 10^9$ poises at 380°C. at a shear stress of 6.5 psi or is of the melt fabricable type having a melt viscosity of from $1 \times 10^3$ to $1 \times 10^6$ poise under the same conditions. The average particle diameter of the tetrafluoroethylene polymer particles in the dispersion is measured by a relationship based on light scattering theory, from the percentage of incident light transmitted at 546 millimicron wave length through a unit measure of a dilute aqueous dispersion (about 0.02 weight percent polytetrafluoroethylene particles using a nominal value of 0.020 cc. per gram of homopolymer for the refractive index increment $\Delta n$ divided by $\Delta c$ of said dispersion at 25°C. since the measurement is made on dispersions containing surfactant). The particle size so obtained is an average particle diameter of the particles measured and in theory is nearly equal to the weight average particle diameter as confirmed by ultracentrifuge analysis or by direct measurement using electron micrographs of the particles at 20,000 diameters magnification. The particles can be spherical or irregularly shaped such as elongated in shape. The preferred average particle diameter for the polytetrafluoroethylene particles in the dispersion is from 0.32 to 0.45 micron, although the invention is fully applicable to the smaller particle sizes, e.g., down to an average particle diameter of 0.05 micron, which characterize some of the homopolymer and the copolymer aqueous dispersions available. The preferred tetrafluoroethylene polymer concentration in the aqueous medium is from 55 to 65% by weight. The tetrafluoroethylene polymer concentrations (polymer solids) disclosed herein are based on the weight of the total dispersion.

The compositions of the present invention can be made by adding the surfactant and alkylene oxide polymer to the aqueous dispersion following polymerization. If the dispersion as produced by polymerization has a lower polymer solids concentration than desired, then the dispersion can be concentrated such as by the surfactant addition and decantation procedure described hereinbefore, followed by addition of the alkylene oxide polymer to the concentrated aqueous dispersion. In the latter case, the surfactant content in the concentrated aqueous dispersion will generally be from 1.0 to 4.0% by weight, and no more surfactant need be added. The alkylene oxide polymer can be added to the concentrated dispersion to obtain the storage stability for the dispersion desired. The resultant stabilized polytetrafluoroethylene aqueous dispersion is useful in the same manner as tetrafluoroethylene polymer aqueous dispersions available heretofore.

Dispersion viscosity is measured using a Brookfield Synchro-Lectric viscometer Model LTV. All measurements are taken at 60 rpm. at a temperature of 23° to 27°C. using the appropriate spindle.

Storage stability is measured by the rate of coagulum or sediment formation in a polytetrafluoroethylene aqueous dispersion, 100 milliliters of which is contained in a 100 milliliter graduated cylinder, which is capped and stored at ambient conditions (approximately 25°C.). Every 30 days the height of the interface between dispersion and clear supernate is measured (in milliliters) and then the cylinder is inverted once and the volume of sediment accumulated at the bottom is measured (in milliliters).

An accelerated test for the rate of sedimentation consists of adding 30 milliliters of polytetrafluoroethylene in aqueous dispersion to a graduated centrifuge tube, centrifuging for two hours (in an X-213 International Clinical Centrifuge with a head which will accommodate two 15 milliliter tubes and two 50 milliliter tubes) at 2,000 rpm, pouring out the dispersion and noting the volume of sediment remaining in the tube.

Examples of the present invention are as follows (parts and percents are by weight unless otherwise indicated):

For comparison purposes, a series of aqueous dispersions was prepared in which the average particle diameter was in the range of 0.32 to 0.38 micron and in which the nonionic surfactant content after concentration was 1.3% by weight when using "Alfonic" 1012-60 and 1.9% by weight when using "Triton" X-100. To these dispersions, various amounts of additional nonionic surfactant were added and the concentration of polytetrafluoroethylene standardized to 60% by weight to demonstrate the effect of the use of surfactant, only, for improving storage stability, with the following results being obtained:

| Dispersion | Total Surfactant Content-wt% | Dispersion Vicosity (cp. at 25°C.) | Storage Stability (Accelerated test — ml. of Sediment) |
|---|---|---|---|
| a | 3.3 | 11.2 | 9.0 |
| b | 5.3 | 13.3 | 6.8 |
| c | 7.3 | 17.6 | 3.8 |
| d | 9.3 | 160 | 3.8 |
| e | 11.3 | 336 | 3.0 |
| f | 2.0 | 11.5 | 10.0 |
| g | 4.0 | 11.8 | 10.0 |
| h | 6.0 | 14.8 | 6.8 |
| i | 8.0 | 16.9 | 4.0 |
| j | 10.0 | 21.5 | 2.3 |
| k | 12.0 | 224 | 1.7 |

In dispersions *a–e*, the surfactant used to concentrate the dispersion was the nonionic surfactant "Alfonic" 1012–60 from Continental Can Company, $CH_3(CH_2)_8CH_2(OCH_2CH_2)_5OH$, and the nonionic surfactant added thereafter was "Triton" DN-65, $CH_3(CH_2)_{10-11}CH_2(OCH_2CH_2)_{12-13}(OC_3H_6)_{4-5}OH$, from Rohm and Haas.

In dispersions f-k, the surfactant used to concentrate the dispersion was "Triton" X-100

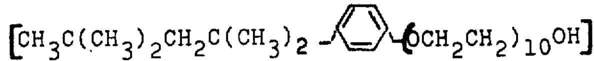

from Rohm and Haas and the same nonionic surfactant was added after concentration to reach the level indicated in the above table.

From the results shown in the table, the combination of ethoxylated aliphatic alcohol surfactants used in dispersions a-e require a concentration of 7.3 wt.% before a fair degree of storage stability is attained while 11.3% is required for good storage stability but it exhibits a viscosity of 336 cp. Dispersions *f–k* behave similarly in that 8.0% surfactant concentration is required to reach fair storage stability, while 12.0% is required for excellent storage stability but accompanied by a viscosity increase to 224 cp.

EXAMPLES 1–14

These examples illustrate the high storage stability obtainable by replacing a major proportion of the surfactant conventionally added heretofore with polyethylene glycols of various molecular weights. The polytetrafluoroethylene aqueous dispersion used is the same as used in the foregoing comparison series and the surfactant content is the residue of nonionic surfactant remaining in the dispersion after decantation of the water-surfactant layer. The polyethylene glycol is then added to the resultant concentrated aqueous dispersion and subjected to the storage stability test, with the following results:

| Example | Surfactant[1] wt.% | Polyethylene Glycol Molecular wt. | Wt.%[2] | Viscosity cp. at 25°C. | Vol. Sediment-ml. |
|---|---|---|---|---|---|
| 1 | 2.0 | 1300–1600 | 13.3 | 33.9 | 1.6 |
| 2 | 2.1 | 6000–7500 | 1.3 | 15.2 | 7.5 |
| 3 | 2.1 | " | 2.0 | 18.3 | 4.2 |
| 4 | 2.1 | " | 2.7 | 19.2 | 3.2 |
| 5 | 2.1 | " | 3.3 | 23.2 | 2.0 |
| 6 | 2.1 | " | 6.0 | 24.6 | 2.5 |
| 7 | 2.0 | " | 5.0 | 29.2 | 2.5 |
| 8 | 1.8 | " | 6.7 | 38.7 | 1.2 |
| 9 | 1.8 | 15000 | 1.3 | 20.4 | 2.6 |
| 10 | 1.8 | " | 2.7 | 42.4 | 1.0 |
| 11 | 1.8 | " | 4.0 | 95.5 | 0.4 |
| 12 | 1.8 | " | 5.3 | 196 | 0.2 |
| 13 | 2.0 | 570–630 | 18.7 | 31.3 | 1.8 |
| 14 | 2.3 | 6000–7500 | 2.7 | 16.3 | 2.7 |

[1]For Examples 1-13, the surfactant was "Triton" X-100 and for Example 14, "Alfonic" 1012-60.
[2]Wt. % based on weight of polymer solids.

These results show that polyethylene glycol is more effective than nonionic surfactant in improving storage stability in that relatively smaller concentrations of polyethylene glycol impart as good as or better storage stability to the dispersion than do larger concentrations of nonionic surfactant and without the attendant excessive increase in dispersion viscosity. By way of comparison, a surfactant level of 7.3 wt. % was required for dispersion c to reach a sediment volume of 3.8 ml. while Example 4 shows a sediment volume of 3.2 ml at a total additive concentration of only 4.9 wt. % (surfactant plus glycol) and Example 9 shows still better improvement at a total additive concentration of only 3.1 wt. %.

Examples 1 and 13 which use alkylene oxide polymer of a molecular weight too low to fall within the invention, show the ineffectiveness of low molecular weight alkylene oxide polymer unless used in extremely high uneconomical amounts.

EXAMPLES 15–19

In this series of experiments dispersions stabilized by surfactant alone and by surfactant plus polyethylene glycol were subjected to the long-term storage stability test. The polytetrafluoroethylene aqueous dispersion was the same as used hereinbefore. One sample of the dispersion (61.9 wt. % polymer solids) contained 2.1 wt. % Alfonic 1012–60 remaining from the concentration step and 7.5 wt. % DN–65 added to the concentrated aqueous dispersion. The resultant dispersion exhibited a viscosity of 270 cp at 25°C. and 11 ml of sediment formed in it after 4 months of storage at ambient temperatures. To other samples of the dispersion (60.0 wt. % polymer solids) concentrated using "Triton" X–100 surfactant, varying amounts of polyethylene glycol of varying molecular weight were added, with the following results being obtained.

| Example | Surfactant wt.% | Polyethylene Glycol Molecular wt. | wt.%[2] | Viscosity cps at 25°C. | Ml. Sediment 4 months |
|---|---|---|---|---|---|
| 15 | 2.1 | 6500–7500 | 2.7 | 19.9 | 3 |
| 16 | 2.0 | 6000–7500 | 5.0 | 29.2 | 2 |
| 17 | 1.85 | 15,000 | 3.0 | 46.0 | 4 |
| 18 | 1.81 | 15,000 | 5.3 | 196 | 2 |
| 19 | 2.0 | 1300–1600 | 13.4 | 33.9 | 3 |

These results show improved storage stability under conditions resembling actual usage. As the results indicate, this improvement is obtainable at lower additive concentrations.

Example 19 shows the ineffectiveness of low molecular weight alkylene oxide polymers unless used in large amounts.

EXAMPLES 20 and 21

This series of experiments illustrates the relative insensitivity of viscosity to small changes in temperature of dispersions of the present invention. The polytetrafluoroethylene aqueous dispersion described in detail hereinbefore was concentrated using "Alfonic" 1012–60. DN–65 was subsequently added to the concentrate to increase the surfactant content to 9.0 wt. %. The final solids level was 59.5 wt. % polymer solids. This dispersion had a viscosity of 35 cp. at 23°C. which increased nearly linearly to 64 cp. at 27°C.

By way of comparison, the same polytetrafluoroethylene aqueous dispersion was concentrated using "Triton" X–100, with the resultant concentrated dispersion containing 2.8 wt. % of this surfactant, and to this dispersion was added 2.7 wt. % of polyethylene glycol (molecular weight 6000-7500). The final solids level was 60.7 wt. % polymer solids. The resultant dispersion had a constant viscosity over the temperature range of 23° to 27°C.

Similarly, to the same dispersion concentrated with "Triton" X–100 and having a residual surfactant content of 1.8 wt. % ("Triton" X–100) was added 3.2 weight percent of 15,000 molecular weight polyethylene glycol. The final solids level was 60 wt. % polymer solids. The resultant dispersion had a viscosity of 57 cp. at 23°C. which decreased linearly with increasing temperature to 50 cp. at 27°C.

EXAMPLE 22

The procedure and polyethylene glycol of Examples 9–12 were essentially repeated except that the surfactant concentration was 4.0 % by wt. and the glycol concentration was 3.3% by wt. The resultant dispersion exhibited a viscosity at 25°C of 60.1 cp. and a volume of sediment of 0.3 ml in the storage stability test. The glycol used in this Example and in Examples 9 to 12 is Polyethylene Glycol Compound 20M.

EXAMPLE 23

In another experiment, the alkylene oxide polymer used was a methoxy polyethylene glycol having a molecular weight of about 5000. An aqueous dispersion of polytetrafluoroethylene containing 2.2% by wt. "Triton" X–100 after concentration was formulated to 6% by wt. of the aforementioned glycol and 60% polytetrafluoroethylene polymer solids concentration. The resultant dispersion exhibited a viscosity of 20 cp. at 25°C. and a sediment volume of only 1.5 ml.

EXAMPLE 24

The procedure of Example 23 was essentially repeated, except that the alkylene oxide polymer was "UCON" 75–H–90,000, an ethylene oxide polymer having a small proportion of propylene oxide units distributed randomly along the polymer chain and terminated with one hydroxyl group. The concentration of this oxide polymer in the dispersion was 4.3% by wt., and the resultant 60% polymer solids dispersion exhibited a viscosity of 19.7 cp. at 25°C. and a volume of sediment of only 1.8 ml.

EXAMPLE 25

The procedure of Example 23 was essentially repeated except that the "Triton" X–100 concentration was 1.8% by wt. and the glycol was a linear glycol having a molecular weight of about 18,500 (as distinguished from the Polyethylene Glycol Compound 20M described hereinbefore) used to reach a concentration of 3.3% by wt. in the dispersion. The resultant 60% polymer solids dispersion exhibited a viscosity of 32.4 cp. at 25°C. and a volume of sediment of only 1.9 ml.

As many apparently widely different embodiments of this invention may be made without departing from the spirit and scope thereof, it is to be understood that this invention is not limited to the specific embodiments thereof.

The embodiments of the invention in which an exclusive property or privilege is claimed are as follows:

1. An aqueous dispersion consisting essentially of water; tetrafluoroethylene polymer particles wherein the polymer is tetrafluoroethylene homopolymer or a copolymer of tetrafluoroethylene with up to 35% by weight based on weight of copolymer of another copolymerizable ethylenically unsaturated monomer; a nonionic surfactant dissolved in said water, present in an amount of about 1 to 6 % by weight based on weight of tetrafluoroethylene polymer; and an essentially hydrophilic alkylene oxide polymer having a molecular weight of at least 5000 dissolved in said water, said alkylene oxide polymer being present in an amount of between about 1 to 6 % by weight based on weight of tetrafluoroethylene polymer.

2. The composition of claim 1 wherein the alkylene oxide polymer is polyethylene glycol.

3. The composition of claim 1 wherein the tetrafluoroethylene polymer is polytetrafluoroethylene.

4. The composition of claim 1 wherein the tetrafluoroethylene polymer particles are present in an amount of between about 55 and 65 % by weight based on weight of said dispersion.

* * * * *